(12) United States Patent
Fulton et al.

(10) Patent No.: US 9,947,208 B2
(45) Date of Patent: Apr. 17, 2018

(54) SYSTEMS AND METHODS FOR MONITORING MAINTENANCE INTERVALS

(71) Applicant: THE BOEING COMPANY, Chicago, IL (US)

(72) Inventors: Jonathan A. Fulton, Mount Pleasant, SC (US); Andrew J. Pinion, Ladson, SC (US); Whitney Michelle Loubier, Mount Pleasant, SC (US); Matthew Pistorius, Mount Pleasant, SC (US); Shibin Mathew, Ladson, SC (US); Wei Mi, Summerville, SC (US); Benjamin Q. Bodenmiller, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 71 days.

(21) Appl. No.: 15/099,696

(22) Filed: Apr. 15, 2016

(65) Prior Publication Data

US 2017/0301211 A1 Oct. 19, 2017

(51) Int. Cl.
*G08B 21/18* (2006.01)
*B64F 5/00* (2017.01)
(Continued)

(52) U.S. Cl.
CPC ............. *G08B 21/187* (2013.01); *B64F 5/00* (2013.01); *G08B 21/182* (2013.01); *G05B 19/4063* (2013.01); *G05B 23/0283* (2013.01); *G05B 2219/32233* (2013.01); *G05B 2219/32234* (2013.01); *G06Q 10/10* (2013.01); *G06Q 10/20* (2013.01)

(58) Field of Classification Search
CPC ....... G08B 21/187; G08B 21/182; B64F 5/00; G05B 23/0283; G05B 2219/32233; G05B 2219/32234; G05B 19/4063; G06Q 10/10; G06Q 10/20
See application file for complete search history.

(56) References Cited

U.S. PATENT DOCUMENTS 7,551,086 B2    6/2009  Coop et al.
7,698,149 B2 *  4/2010  Nishikawa ............. G06Q 10/10
                                                705/1.1

(Continued)

*Primary Examiner* — Mohamed Barakat
(74) *Attorney, Agent, or Firm* — Armstrong Teasdale LLP

(57) ABSTRACT

A system for monitoring maintenance for manufacturing apparatuses in a facility is provided. The system includes at least one manufacturing apparatus, the manufacturing apparatus including an RF identification tag and a module, and a control system. The control system is configured to receive, from the module, operational status information that indicates time periods during which the manufacturing apparatus is in operation, determine a cumulative time duration of operation for the manufacturing apparatus, retrieve a predetermined maintenance interval for the manufacturing apparatus, determine whether the cumulative time duration of operation exceeds the predetermined maintenance interval, and in response to a determination that the cumulative time duration of operation exceeds the predetermined maintenance interval, i) output a signal that causes the manufacturing apparatus to discontinue operation, and ii) cause instructions for completing a required maintenance procedure to be displayed on a display device in communication with the control system.

20 Claims, 4 Drawing Sheets

(51) Int. Cl.
    *G06Q 10/00*     (2012.01)
    *G05B 19/4063*     (2006.01)
    *G06Q 10/10*     (2012.01)
    *G05B 23/02*     (2006.01)

(56) References Cited

U.S. PATENT DOCUMENTS

| | | |
|---|---|---|
| 8,198,986 B2 | 6/2012 | Craik |
| 8,212,673 B1 | 7/2012 | Whittaker |
| 8,442,666 B2 * | 5/2013 | Suginishi ......... G05B 19/41865 700/101 |
| 8,981,967 B1 * | 3/2015 | Shore ........................ B64F 5/00 340/945 |
| 8,991,692 B2 | 3/2015 | Kumar et al. |
| 9,117,093 B2 * | 8/2015 | Gross .................. G06F 11/0712 |
| 2011/0221574 A1 | 9/2011 | Eckl et al. |
| 2012/0078670 A1 * | 3/2012 | Yamamura ......... G05B 19/4184 705/7.11 |
| 2015/0051786 A1 * | 2/2015 | Wang ........................ B64F 5/60 701/29.4 |
| 2015/0324759 A1 * | 11/2015 | Bansal ............. G06Q 10/06311 702/184 |
| 2016/0246274 A1 * | 8/2016 | Ikeda ................ G05B 19/4063 |

\* cited by examiner

SYSTEMS AND METHODS FOR MONITORING MAINTENANCE INTERVALS

BACKGROUND

The field of the disclosure relates generally to manufacturing equipment, and, more particularly, to monitoring maintenance intervals for manufacturing equipment.

Manufacturing facilitates, such as aircraft manufacturing facilities, generally include a relatively large number of machines. In such an environment, it may be relatively difficult to track how often each machine is in operation, and accordingly, when maintenance should be performed on each machine. Further, it may be difficult to accurately determine a location of all machines within the manufacturing facility.

BRIEF DESCRIPTION

In one aspect, a system for monitoring maintenance for manufacturing apparatuses in a facility is provided. The system includes at least one manufacturing apparatus, the manufacturing apparatus including an RF identification tag and a module for communicating information about when the manufacturing apparatus is in operation, and a control system in communication with the RF identification tag and module. The control system is configured to receive, from the module, operational status information that indicates time periods during which the manufacturing apparatus is in operation, determine a cumulative time duration of operation for the manufacturing apparatus based on the operational status information, retrieve a predetermined maintenance interval for the manufacturing apparatus, determine whether the cumulative time duration of operation exceeds the predetermined maintenance interval, and in response to a determination that the cumulative time duration of operation exceeds the predetermined maintenance interval, i) output a signal that causes the manufacturing apparatus to discontinue operation, and ii) cause instructions for completing a required maintenance procedure for the manufacturing apparatus to be displayed on a display device in communication with the control system.

In another aspect, a method for monitoring maintenance for manufacturing apparatuses in a facility is provided. The method includes communicating information from a module of at least one manufacturing apparatus to a control system, the manufacturing apparatus including the module and an RF identification tag, receiving from the module, at the control system, operational status information that indicates time periods during which the manufacturing apparatus is in operation, determining, at the control system, a cumulative time duration of operation based on the operational status information, retrieving, at the control system, a predetermined maintenance interval for the manufacturing apparatus, determining, at the control system, whether the cumulative time duration of operation exceeds the predetermined maintenance interval, and outputting from the control system, in response to a determination that the cumulative time duration of operation exceeds the predetermined maintenance interval, a signal that causes the manufacturing apparatus to discontinue operation.

In yet another aspect, a control system for monitoring maintenance for manufacturing apparatuses in a facility is provided. The control system includes a memory device, and a processor communicatively coupled to the memory device. The processor is configured to receive, from a module of at least one manufacturing apparatus, operational status information that indicates time periods during which the manufacturing apparatus is in operation, determine a cumulative time duration of operation for the manufacturing apparatus based on the operational status information, retrieve a predetermined maintenance interval for the manufacturing apparatus, determine whether the cumulative time duration of operation exceeds the predetermined maintenance interval, and in response to a determination that the cumulative time duration of operation exceeds the predetermined maintenance interval, i) output a signal that causes the manufacturing apparatus to discontinue operation, and ii) cause instructions for completing a required maintenance procedure for the manufacturing apparatus to be displayed on a display device in communication with the control system.

DETAILED DESCRIPTION

The implementations described herein facilitate monitoring maintenance for one or more manufacturing apparatuses. A control system receives operational status information that indicates time periods during which the manufacturing apparatus is in operation. The control system determines a cumulative time duration of operation, and compares the cumulative time duration of operation against a predetermined maintenance interval. If the cumulative time duration of operation exceeds the predetermined maintenance interval, the control system causes the manufacturing apparatus to discontinue operation and causes instructions for completing a required maintenance procedure to be displayed.

Figure 1:
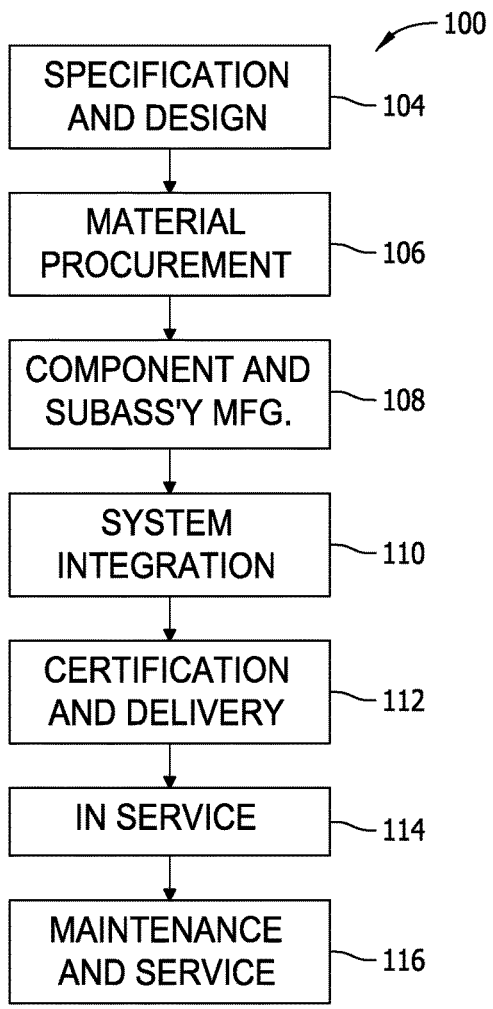
FIG. 1 is a flow diagram of an exemplary aircraft production and service method.
Figure 2:
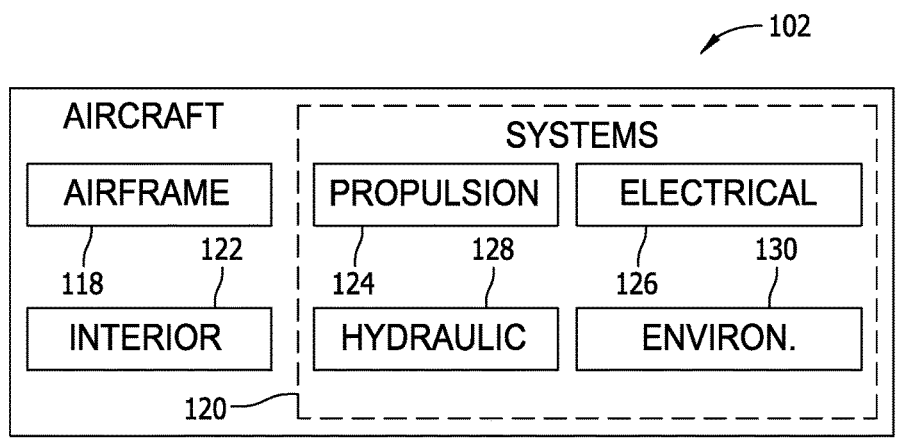
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Figure 3:
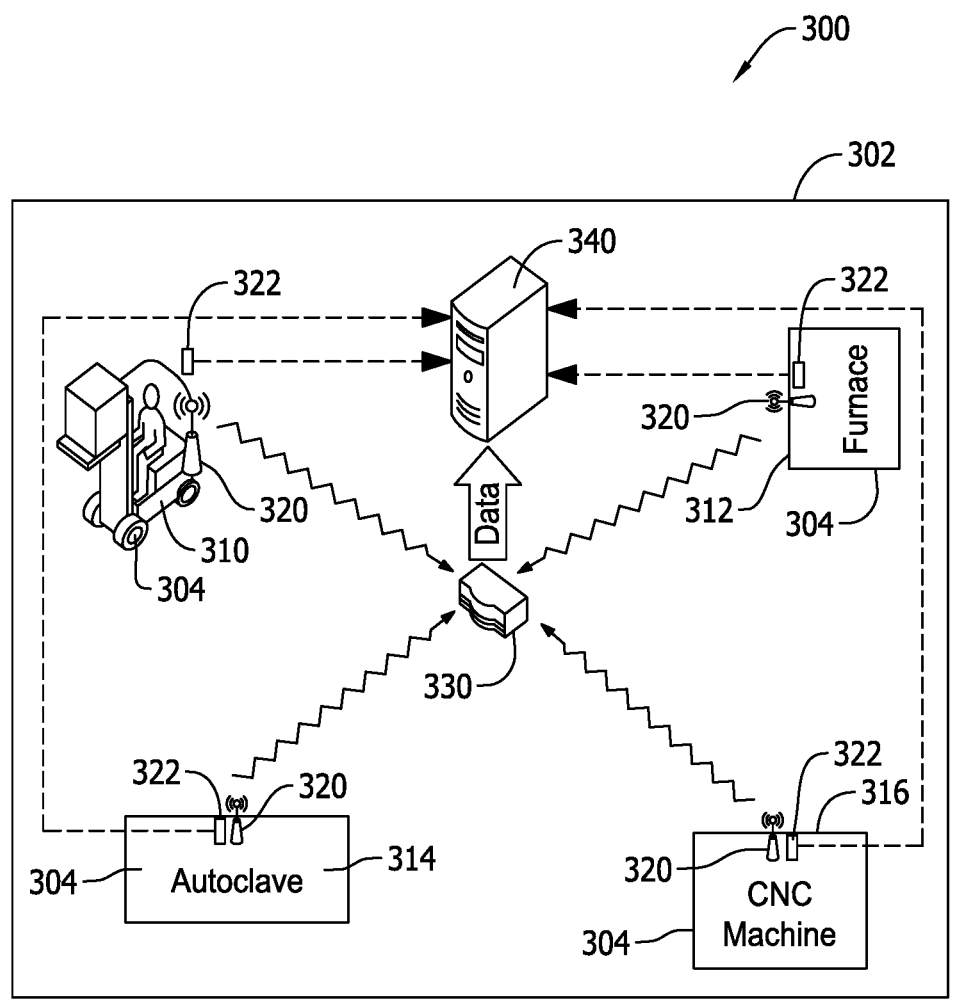
FIG. 3 is a schematic diagram of an exemplary maintenance monitoring system.

FIG. 3 is a schematic diagram of an exemplary maintenance monitoring system 300. System 300 is implemented within a facility 302, such as a maintenance facility used to perform aircraft manufacturing and service method 100 (shown in FIG. 1). In implementations, system 300 includes a plurality of manufacturing apparatuses 304. In the exemplary implementation, system 300 includes a forklift 310, a furnace 312, an autoclave 314, and a computerized numerical control (CNC) machine 316. Alternatively, in other implementations, system 300 may include any manufacturing apparatuses 304 suitable for monitoring as described herein.

As shown in FIG. 3, each manufacturing apparatus 304 includes a radio frequency identification (RFID) transmitter 320 and a wireless machine status transmitter 322. Each RFID transmitter 320 transmits a radio signal that is detected by an RFID receiver 330. The transmitted radio signal includes a serial number that is unique to the associated manufacturing apparatus 304. Based on the received radio signal, RFID receiver 330 is able to determine a location of each manufacturing apparatus 304. This determined location is provided to a control system 340 in the exemplary implementation.

In the exemplary implementation, RFID transmitter 320 is a RFID tag. The RFID tag may be a passive RFID tag that uses radio energy in an interrogation radio signal (e.g., received from RFID receiver 330 or control system 340) to generate and emit the radio signal including the unique serial number. Alternatively, the RFID tag may be an active RFID tag that includes a battery that periodically transmits the radio signal to RFID receiver 330. Further, the RFID tag may be read-only or read/write, in which data can be written into the RFID tag.

Each wireless machine status transmitter 322 generates and transmits an operational status signal to control system 340 in the exemplary implementation. The operational status signal indicates an operational status of the associated manufacturing apparatus 304. In the exemplary implementation, the operational status signal indicates whether associated manufacturing apparatus 304 is currently in use, and also indicates time periods during which the associated manufacturing apparatus 304 was actively operating. From the operational status signal, control system 340 is able to determine a cumulative time duration of operation (i.e., how long the associated manufacturing apparatus 304 has been actively operating), as described in detail herein. The operational status signal may also include additional information. For example, the operational status signal may include a temperature of associated manufacturing apparatus 304. Control system 340 is located in facility 302 within transmission range of each RFID transmitter 320 and wireless machine status transmitter 322 for each manufacturing apparatus 304.

Figure 4:
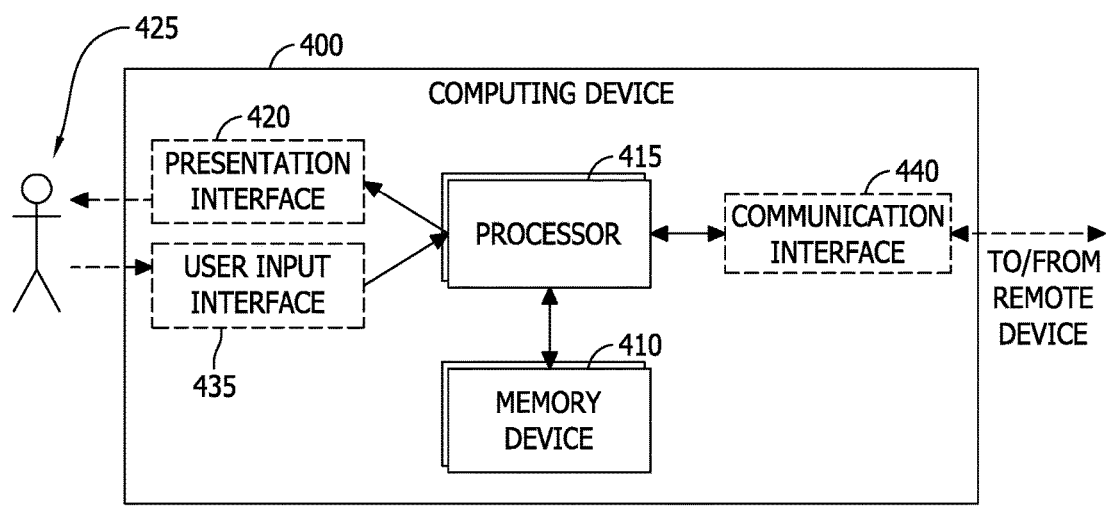
FIG. 4 is a block diagram of an exemplary computing device that may be used to implement the system of FIG. 3.

FIG. 4 is a block diagram of a computing device 400 that may be used to implement control system 340. Computing device 400 may perform a method for monitoring maintenance of manufacturing apparatuses 304, as described herein.

In the exemplary implementation, computing device 400 includes at least one memory device 410 and a processor 415 that is coupled to memory device 410 for executing instructions. In some implementations, executable instructions are stored in memory device 410. In the exemplary implementation, computing device 400 performs one or more operations described herein by programming processor 415. For example, processor 415 may be programmed by encoding an operation as one or more executable instructions and by providing the executable instructions in memory device 410.

Processor 415 may include one or more processing units (e.g., in a multi-core configuration). Further, processor 415 may be implemented using one or more heterogeneous processor systems in which a main processor is present with secondary processors on a single chip. In another illustrative example, processor 415 may be a symmetric multi-processor system containing multiple processors of the same type. Further, processor 415 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, memory device 410 is one or more devices that enable information such as executable instructions and/or other data to be stored and retrieved. Memory device 410 may include one or more computer readable media, such as, without limitation, dynamic random access memory (DRAM), static random access memory (SRAM), a solid state disk, and/or a hard disk. Memory device 410 may be configured to store, without limitation, application source code, application object code, source code portions of interest, object code portions of interest, configuration data, execution events and/or any other type of data.

In the exemplary implementation, computing device 400 includes a presentation interface 420 that is coupled to processor 415. Presentation interface 420 presents information to a user 425. For example, presentation interface 420 may include a display adapter (not shown) that may be coupled to a display device, such as a cathode ray tube (CRT), a liquid crystal display (LCD), an organic LED (OLED) display, and/or an "electronic ink" display. In some implementations, presentation interface 420 includes one or more display devices.

In the exemplary implementation, computing device 400 includes a user input interface 435. User input interface 435 is coupled to processor 415 and receives input from user 425. User input interface 435 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 420 and user input interface 435.

Computing device 400, in the exemplary implementation, includes a communication interface 440 coupled to processor 415. Communication interface 440 communicates with one or more remote devices. To communicate with remote devices, communication interface 440 may include, for example, a wired network adapter, a wireless network adapter, and/or a mobile telecommunications adapter.

Figure 5:
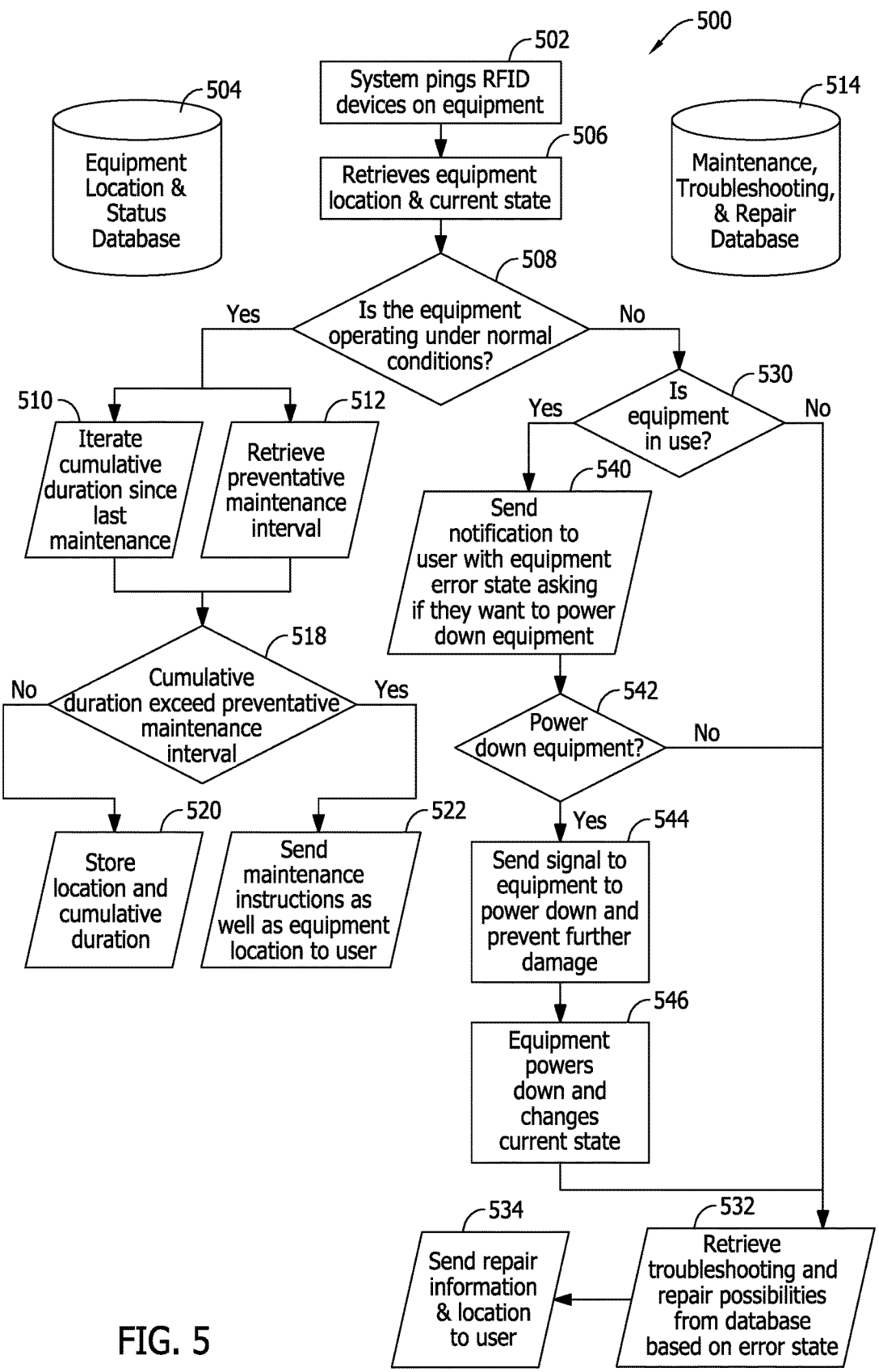
FIG. 5 is a flow diagram of an exemplary method for monitoring maintenance of manufacturing equipment that may be performed using the computing device shown in FIG. 4.

FIG. 5 is a flow diagram of an exemplary method 500 for monitoring maintenance of manufacturing equipment, such as manufacturing apparatuses 304 (shown in FIG. 3). Method 500 may be performed, for example, using computing device 400 (shown in FIG. 4).

In the exemplary implementation, at block 502, a system, such as control system 340 or RFID receiver 330 (both shown in FIG. 3), pings, or interrogates, RFID devices on manufacturing equipment, such as RFID transmitters 320 (shown in FIG. 3). This causes the RFID devices to transmit radio signals that may be used to determine a location of the manufacturing equipment, as described above. The determined location is stored in an equipment location and status database 504. Equipment location and status database 504 may be included within memory device 410, or may be a separate database communicatively coupled to computing device 400. Equipment location and status database 504 also includes data regarding an operational status of the manufacturing equipment. The data regarding an operational status may be generated from, for example, operational status signals received from wireless machine status transmitter 322 (shown in FIG. 3). Accordingly, in the exemplary implementation, the equipment location and status database 504 stores data indicating whether manufacturing equipment is currently in use, as well as time periods during which the manufacturing equipment was actively operating.

At block 506, the system retrieves the equipment location and a current operational state of the equipment from equipment location and status database 504. At block 508, the system determines whether the manufacturing equipment is operating under normal conditions. For example, in one implementation, the equipment has certain operating threshold that are predefined (e.g., by the manufacturer or by another user), and these operating thresholds may be stored in a database, such as equipment location and status database 504 or a maintenance, troubleshooting, and repair database 514. Parameters associated with the operating thresholds are then monitored constantly and sent to the database to determine whether the monitored parameters exceed specifications defined by the operating thresholds. For example, autoclave 314 (shown in FIG. 3) may have temperature thresholds that, if exceeded, result in a determination that autoclave 314 is not operating under normal conditions. In another example, forklift 310 (shown in FIG. 3) may have hydraulic pressure thresholds that, if a monitored hydraulic pressure falls below, result in a determination that forklift 310 is not operating under normal conditions.

If the equipment is operating under normal conditions, flow proceeds to blocks 510 and 512. At block 510, the system iterates a cumulative time duration of operation since the last maintenance was performed. That is, the system calculates how long the associated manufacturing equipment has been actively operating since the most recent maintenance event. At block 512, the system retrieves a predetermined preventative maintenance interval. The predetermined preventative maintenance interval may be retrieved, for example, from maintenance, troubleshooting, and repair database 514. Maintenance, troubleshooting, and repair database 514 may be included within memory device 410, or may be a separate database communicatively coupled to computing device 400.

At block 518, the system compares the cumulative time duration of operation to the predetermined preventative maintenance interval to determine whether the cumulative time duration of operation exceeds the predetermined preventative maintenance interval for the associated manufacturing equipment. If the cumulative time duration of operation does not exceed the predetermined preventative maintenance interval, the system stores the location of the equipment and the cumulative time duration of operation (e.g., in memory device 410) at block 520.

If the cumulative time duration of operation does exceed the predetermined preventative maintenance interval, maintenance should be performed. Accordingly, at block 522 the system retrieves stored maintenance instructions corresponding to the associated manufacturing equipment and sends maintenance instructions and the equipment location to a user, so that the user may perform maintenance on the equipment. The maintenance instructions and equipment location may be transmitted, for example, to a user computing device operated by the user. In one exemplary implementation, control system 340 and/or computing device 400 may generate an output to cause the display, of an alert and instructions for a required maintenance procedure, on a display device that is associated with or proximate to the associated manufacturing equipment, for completing the required maintenance procedure on the associate manufacturing equipment. In some implementations, in addition to transmitting the maintenance instructions and equipment location to the user, the system may also transmit a shutdown signal to the equipment that causes the equipment to discontinue operation.

Returning to block 508, if the system determines that the equipment is not operating under normal conditions, flow proceeds to block 530, at which the system determines whether the equipment is currently in use. If the equipment is not currently in use, flow proceeds to block 532, where troubleshooting and possible repair solutions are retrieved from maintenance, troubleshooting, and repair database 514. The troubleshooting and possible repair solutions are selected from maintenance, troubleshooting, and repair database 514 based on an error state determined by the system. At block 534, the troubleshooting and possible repair solutions, as well as the equipment location, are sent to a user. The troubleshooting and possible repair solutions, as well as the equipment location, may be transmitted, for example, to a user computing device operated by the user. In some implementations, automated equipment sends out an error/trouble code automatically using a programmable logic controller, and this error/trouble code is used to determine the error state. In other implementations, sensor measurements and threshold comparisons may be used to automatically identify an error state of the equipment.

If the equipment is currently in use, flow proceeds from block 530 to block 540, and the system sends a notification, including the error state, to the user. The notification also asks the user whether they want to power down the equipment. The user may elect to power down the equipment, for example, to prevent damage to the equipment. At block 542, the system determines whether the user has indicated the equipment should be powered down. If the user indicates the equipment should not be powered down, flow proceeds to block 532. If the user indicates the equipment should be powered down, the system sends a signal to the equipment to power down at block 544. Flow then proceeds to block 546, where the equipment powers down and ceases actively operating. Flow then proceeds to block 532 to retrieve troubleshooting and possible repair solutions.

In the exemplary implementation, computing device 400 generates one or more real-world outputs for a user. For example, upon determining that a cumulative time duration of operation does exceed a predetermined preventative maintenance interval, computing device 400 sends maintenance instructions to a user, prompting the user to perform the required maintenance. Further, computing device 400 may output a signal that causes a manufacturing apparatus to discontinue operation if the manufacturing apparatus is malfunctioning or if the manufacturing apparatus is overdue for required maintenance.

The systems and methods described herein facilitate monitoring maintenance for one or more manufacturing apparatuses. A control system receives operational status information that indicates time periods during which the manufacturing apparatus is in operation. The control system determines a cumulative time duration of operation, and compares the cumulative time duration of operation against a predetermined maintenance interval. If the cumulative time duration of operation exceeds the predetermined maintenance interval, the control system causes the manufacturing apparatus to discontinue operation and causes instructions for completing a required maintenance procedure to be displayed.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring maintenance for manufacturing apparatuses in a facility, the system comprising:
   at least one manufacturing apparatus, the manufacturing apparatus including an RF identification tag and a machine status transmitter operable to communicate information about when the manufacturing apparatus is in operation; and
   a control system in communication with the RF identification tag and module, wherein the control system is configured to:
      receive, from the machine status transmitter, operational status information that indicates time periods during which the manufacturing apparatus is in operation;
      determine a cumulative time duration of operation for the manufacturing apparatus based on the operational status information;
      retrieve a predetermined maintenance interval for the manufacturing apparatus;
      determine whether the cumulative time duration of operation exceeds the predetermined maintenance interval; and
      in response to a determination that the cumulative time duration of operation exceeds the predetermined maintenance interval, i) output a signal that causes the manufacturing apparatus to discontinue operation, and ii) cause instructions for completing a required maintenance procedure for the manufacturing apparatus to be displayed on a display device in communication with the control system.

2. The system of claim 1, wherein the machine status transmitter is further configured to communicate malfunction information to the control system indicating that the manufacturing apparatus is malfunctioning.

3. The system of claim 2, wherein the control system is configured to:
   determine, based on the malfunction information, that the manufacturing apparatus is malfunctioning;
   determine whether the manufacturing apparatus is currently in use; and
   in response to a determination that the manufacturing apparatus is currently in use, transmit a power down signal to the manufacturing apparatus that causes the manufacturing apparatus to power down.

4. The system of claim 3, wherein the control system is configured to:
   retrieve troubleshooting and repair information in response to the determination that the manufacturing apparatus is malfunctioning; and
   cause the troubleshooting and repair information to be displayed on the display device.

5. The system of claim 1, wherein the at least one manufacturing apparatus comprises a plurality of manufacturing apparatuses.

6. The system of claim 1, further comprising an RF receiver configured to:
   receive a radio signal from the RF identification tag; and
   determine a location of the manufacturing apparatus within the facility based on the received radio signal.

7. The system of claim 6, wherein the control system is further configured to:
   receive the determined location from the RF receiver; and
   cause the determined location to be displayed on the display device.

8. A method for monitoring maintenance for manufacturing apparatuses in a facility, the method comprising:
   communicating information from a module of at least one manufacturing apparatus to a control system, the manufacturing apparatus including the module and an RF identification tag;
   receiving from the module, at the control system, operational status information that indicates time periods during which the manufacturing apparatus is in operation;
   determining, at the control system, a cumulative time duration of operation based on the operational status information;
   retrieving, at the control system, a predetermined maintenance interval for the manufacturing apparatus;
   determining, at the control system, whether the cumulative time duration of operation exceeds the predetermined maintenance interval; and
   outputting from the control system, in response to a determination that the cumulative time duration of operation exceeds the predetermined maintenance interval, a signal that causes the manufacturing apparatus to discontinue operation.

9. The method of claim 8, further comprising generating at the control system, in response to the determination that the cumulative time duration of operation exceeds the predetermined maintenance interval, an output that causes a display device in communication with the control system to display instructions for completing a required maintenance procedure for the manufacturing apparatus.

10. The method of claim 9, further comprising performing the required maintenance procedure for the manufacturing apparatus.

11. The method of claim 8, further comprising receiving from the module, at the control system, malfunction information indicating that the manufacturing apparatus is malfunctioning.

12. The method of claim 11, further comprising:
   determining whether the manufacturing apparatus is currently in use; and
   transmitting, in response to a determination that the manufacturing apparatus is currently in use, a power down signal to the manufacturing apparatus that causes the manufacturing apparatus to power down.

13. The method of claim 12, further comprising:
   retrieving troubleshooting and repair information in response to the determination that the manufacturing apparatus is malfunctioning; and
   causing the troubleshooting and repair information to be displayed on a display device.

14. The method of claim 8, wherein communicating information from a module of at least one manufacturing apparatus to a control system comprises communicating information from a plurality of manufacturing apparatuses to the control system.

15. The method of claim 8, further comprising:
   receiving, an at RF receiver, a radio signal from the RF identification tag; and
   determining a location of the manufacturing apparatus within the facility based on the received radio signal.

16. The method of claim 15, further comprising:
   receiving, at the control system, the determined location from the RF receiver; and
   causing the determined location to be displayed on the display device.

17. A control system for monitoring maintenance for manufacturing apparatuses in a facility, the control system comprising:
   a memory device; and
   a processor communicatively coupled to the memory device, the processor configured to:
      receive, from a module of at least one manufacturing apparatus, operational status information that indicates time periods during which the manufacturing apparatus is in operation;
      determine a cumulative time duration of operation for the manufacturing apparatus based on the operational status information;
      retrieve a predetermined maintenance interval for the manufacturing apparatus;
      determine whether the cumulative time duration of operation exceeds the predetermined maintenance interval; and
      in response to a determination that the cumulative time duration of operation exceeds the predetermined maintenance interval, i) output a signal that causes the manufacturing apparatus to discontinue operation, and ii) cause instructions for completing a required maintenance procedure for the manufacturing apparatus to be displayed on a display device in communication with the control system.

18. The control system of claim 17, wherein the processor is further configured to receive malfunction information from the module, the malfunction information indicating that the manufacturing apparatus is malfunctioning.

19. The control system of claim 18, wherein the processor is further configured to:
   determine, based on the malfunction information, that the manufacturing apparatus is malfunctioning;
   determine whether the manufacturing apparatus is currently in use; and
   in response to a determination that the manufacturing apparatus is currently in use, transmit a power down signal to the manufacturing apparatus that causes the manufacturing apparatus to power down.

20. The control system of claim 18, wherein the processor is further configured to:
   retrieve troubleshooting and repair information in response to the determination that the manufacturing apparatus is malfunctioning; and
   cause the troubleshooting and repair information to be displayed on the display device.

* * * * *